(12) United States Patent
Dames et al.

(10) Patent No.: US 6,371,379 B1
(45) Date of Patent: *Apr. 16, 2002

(54) MAGNETIC TAGS OR MARKERS

(75) Inventors: Andrew Nicholas Dames, Cambridge; Michael David Crossfield, West Wickham, both of (GB)

(73) Assignee: Flying Null Limited, Harston (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,385
(22) PCT Filed: Feb. 16, 1996
(86) PCT No.: PCT/GB96/00367
 § 371 Date: Oct. 9, 1998
 § 102(e) Date: Oct. 9, 1998
(87) PCT Pub. No.: WO97/04338
 PCT Pub. Date: Feb. 6, 1997

(30) Foreign Application Priority Data

Jul. 17, 1995 (GB) .............................................. 9514581
Oct. 19, 1995 (GB) .............................................. 9521442

(51) Int. Cl.⁷ .............................................. G06K 19/06
(52) U.S. Cl. ...................... 235/493; 235/488; 235/449; 235/462.01
(58) Field of Search .............................. 235/493, 492, 235/488, 449, 462.01

(56) References Cited

U.S. PATENT DOCUMENTS

| | | | |
|---|---|---|---|
| 4,075,618 A | 2/1978 | Montean | 340/280 |
| 4,274,089 A | 6/1981 | Giles | 340/572 |
| 4,342,904 A * | 8/1982 | Onsager | 235/493 |
| 4,510,490 A * | 4/1985 | Anderson, III et al. | 340/572 |
| 4,647,917 A * | 3/1987 | Anderson, III et al. | 340/572 |
| 4,682,154 A | 7/1987 | Fearon et al. | |
| 4,743,890 A | 5/1988 | Hilzinger et al. | |
| 4,940,966 A * | 7/1990 | Pettigrew et al. | 340/551 |
| 4,960,651 A * | 10/1990 | Pettigrew et al. | 428/607 |
| 5,017,907 A | 5/1991 | Cordery | |
| 5,083,112 A * | 1/1992 | Piotrowski et al. | 340/572 |
| 5,175,419 A * | 12/1992 | Yamashita | 235/449 |
| 5,204,526 A * | 4/1993 | Yamashita et al. | 235/493 |
| 5,241,163 A * | 8/1993 | Vachtsevanos et al. | 235/449 |
| 5,304,983 A | 4/1994 | Zhou | |
| 5,420,569 A * | 5/1995 | Dames et al. | 340/572 |
| 5,538,803 A * | 7/1996 | Gambino et al. | 428/694 |
| 5,602,527 A * | 2/1997 | Suenaga | 340/551 |
| 5,605,768 A * | 2/1997 | Furkawa et al. | 428/611 |
| 5,650,236 A * | 7/1997 | Hirano et al. | 428/611 |
| 5,729,201 A * | 3/1998 | Jahnes et al. | 340/572 |
| 5,921,583 A * | 7/1999 | Matsumoto et al. | 283/81 |

FOREIGN PATENT DOCUMENTS

| | | |
|---|---|---|
| EP | 1034640 | 9/1983 |
| FR | 7721707 | 7/1977 |
| GB | 1581844 | 7/1977 |
| WO | 9200014 | 1/1992 |
| WO | 9300038 | 1/1993 |

* cited by examiner

Primary Examiner—Karl D. Frech
(74) Attorney, Agent, or Firm—Oppenheimer Wolff & Donnelly LLP

(57) ABSTRACT

A magnetic tag or marker is described which is capable of functioning as a multi-bit information carrying tag. The tag may be attached to an article and then used as a means of identifying that article, generally as it enters or is positioned within an interrogation zone. The tag comprises (a) a first magnetic material characterized by high permeability, low coercivity and a non-linear B-H characteristic; and (b) a second magnetic material which is capable of being permanently magnetized, the second magnetic material being magnetized with a non-uniform field pattern (A, B, C). Detection systems for use with such tags, and write/read system using them, are also disclosed.

36 Claims, 6 Drawing Sheets

Basic Strip Tag Construction

Basic Thin Film Tag Construction

Figure 1a: Basic Strip Tag Construction

Figure 1b: Basic Thin Film Tag Construction

Figure 2: Tag biased to provide 2 signal features

Figure 3: Possible tag interrogation field
Low frequency scanning field combined with high frequency field Figure 4: Detected signal from tag Figure 5: Tag with 3 bias regions and 1 bias level Figure 6: Tag with 2 bias regions and 2 bias levels

FIGURE 7.

Typical Interrogation System (1)

n is harmonic number used for detection

FIGURE 8.

Typical Interrogation System (2)

harmonic numbers n – m analysed

MAGNETIC TAGS OR MARKERS

This invention relates to magnetic tags or markers, to systems for storing data in such tags and for subsequently retrieving the data remotely, and to methods utilising such tags and systems.

Such tags and systems have a wide variety of applications. These include inventory control, ticketing, automated shopping systems, monitoring work-in-progress, security tagging and access control, anti-counterfeiting and item verification.

1. Prior Art

There are a number of passive data tag systems currently available. The most widely-used is based on optically-read printed patterns of lines, popularly known as barcodes. The tag element of such systems is very low-cost, being typically just ink and paper. The readers are also relatively low cost, typically employing scanning laser beams. For many major applications the only real drawback to barcodes is the need for line-of-sight between the reader and the tag.

For applications where line-of-sight is not possible, systems not employing optical transmission have been developed. The most popular employ magnetic induction for coupling between the tag and the interrogator electronics. These typically operate with alternating magnetic fields in the frequency range of 50 kHz to 1 MHz, and generally employ integrated electronic circuits ("chips") to handle receive and transmit functions, and to provide data storage and manipulation. In order to avoid the need for a battery, power for the chip is obtained by rectification of the interrogating signal received by an antenna coil. In order to increase the power transferred, and to provide discrimination against unwanted signals and interference, the coil is usually resonated with a capacitor at the frequency of the interrogation signal carrier frequency. A typical product of this type is the TIRIS system manufactured by Texas Instruments Ltd.

Other multi-bit data tag systems have employed conventional h.f. radio technology, or technologies based on surface acoustic waves or magnetostriction phenomena.

2. The Invention

The present invention relates to a new type of passive data tag system which employs small amounts of very high-permeability magnetic material, and an alternating magnetic field for interrogation. Since the magnetic material can be in the form of a thin foil, wire or film, it can be bonded directly to paper or plastic to form self-supporting tags.

More particularly, according to one aspect of the present invention there is provided a magnetic marker or tag, which comprises (a) a first magnetic material characterised by high permeability, low coercivity and a non-linear B-H characteristic; and (b) a second magnetic material which is capable of being permanently magnetised, characterised in that said second magnetic material is magnetised with a non-uniform field pattern.

Appropriate manufacturing techniques for the new label are well-known in conventional label manufacture, and in particular in the manufacture of 1-bit labels for retail security applications. Alternatively, the magnetic elements could be incorporated directed into the items to be tagged during manufacture.

In such a tag, the field pattern in the second material may vary in amplitude and/or direction and/or polarity. The second magnetic material is advantageously formed of discrete, magnetised sections of a magnetic bias material, e.g. a plastics material substrate coated with a ferromagnetic layer or film, e.g. of ferrite. The desired magnetic field pattern may be written onto a strip or tape of magnetic bias material. Thus it is possible to use audio or video recording tape as the bias material.

The magnetic field pattern may vary across the width of said strip or tape as well as along its length.

Preferably, the first magnetic material has an extrinsic relative permeability greater than $10^3$ and a coercivity not more than 10 A/m. In one embodiment, the first magnetic material takes the form of an elongate strip or wire; in another, it is in the form of a thin film. When a strip form of first magnetic material is used, it preferably has dimensions in the ranges: width—from 0.1 mm to 10 mm, more preferably from 0.5 mm to 5 mm; and thickness from 5 $\mu$m to 500 $\mu$m, more preferably from 10 $\mu$m to 100 $\mu$m. When in thin film form, the first magnetic material is advantageously in the form of one or more patches each having an area in the range 1 $mm^2$ to 500 $mm^2$, preferably from 10 $mm^2$ to 100 $mm^2$. Such patches may each have a thickness in the range from 0.1 $\mu$m to 10 $\mu$m.

If desired, the said first and second magnetic layers may be supported by a substrate formed of paper or a plastics material. Such a support, however, may not be required. The tag will generally be adapted to be secured to an article to serve as an identifying tag for that article. It may, for example, be used as an antipilferage or anti-counterfeiting tag. It may alternatively be used as a verification tag. In this context, it may for example be used to confirm that an article has been assigned to its proper position during a sorting or distribution process.

According to another aspect, the present invention provides a data storage and retrieval system which comprises a plurality of magnetic markers or tags as claimed in claim 1 and a detection system comprising (i) first means for generating an alternating magnetic field; (ii) second means for detecting harmonics generated by the interaction between the first magnetic material of the tag and the alternating magnetic field produced in use by said first means; and (iii) third means for correlating the detection of harmonics by said second means with the alternating magnetic field generated by said first means.

In such a data storage and retrieval system, the third means is preferably arranged to determine the amplitude and phase of the harmonics generated by the interaction of the first magnetic material of the tag and the alternating magnetic field, the harmonics of interest normally being selected from harmonics in the range of 2nd to 100th. The third means may be arranged to determine the characteristics of the harmonics produced by the marker and to compare the detected characteristics with information in a data bank, this information serving to correlate the detected characteristics with known characteristics relating to items on an inventory.

In one embodiment, the third means is arranged to determine the number of harmonic bursts detected per cycle of the generated alternating magnetic field. Alternatively, the third means may be arranged to determine the point or points within each cycle of the alternating magnetic field at which harmonic bursts are detected.

In preferred embodiments, the detection system is arranged to determine the characteristics of harmonic bursts produced by the tag or marker and to compare the detected characteristics with information in a data bank, this information serving to correlate the detected characteristics with known characteristics relating to items on an inventory. The characteristics selected for analysis may include the shape of the envelope of said harmonic bursts.

The means for generating an alternating magnetic field is advantageously arranged so that, in use, it generates a first, high frequency alternating magnetic field and a second, low frequency alternating magnetic field. For example, the high frequency alternating magnetic field may be at a frequency in the range of from 250 Hz to 20 kHz, advantageously in the range from 3 kHz to 10 kHz; and the low frequency alternating magnetic field may be at a frequency in the range of from 1 Hz to 250 Hz, advantageously in the range of from 5 Hz to 50 Hz.

Currently preferred interrogation systems are adapted to generate a high frequency alternating magnetic field at a frequency in the range of from 1 kHz to 10 kHz, e.g. from 4 kHz to 8 kHz, and a low frequency alternating magnetic field at a frequency in the range of from 8 Hz to 50 Hz, e.g. from 10 Hz to 20 Hz.

The system will typically operate with a high frequency alternating magnetic field in the range 1 kHz–10 kHz, together with a low frequency field typically in the range 1–100 Hz.

Alternatively a single alternating field may be used. Such a field may have a frequency in the range of from 50 Hz to 20 kHz. This arrangement, however, requires more complex data processing, as will be described hereinafter.

Embodiments of the invention provide a multi-bit data tag system which employs low-frequency inductive magnetic interrogation, and avoids the need for complex, expensive tags.

The tag consists of a high permeability, low coercivity magnetic alloy element combined with a medium coercivity ferromagnetic element capable of being permanently magnetised. As explained above, the first or high permeability magnetic element preferably has an extrinsic relative permeability >$10^3$ and preferably at least $10^4$; and a coercivity <10 Amps/m. This generally requires a material with high intrinsic permeability and low coercivity, in a form such as a long thin strip or a thin film which avoids major internal demagnetisation effects. Strip materials are readily-available commercially from suppliers such as Vacuumschmeltze (Germany), Allied-Signal Corp (USA) and Unitika (Japan). Thin film material is currently manufactured in high volume by IST (Belgium) for use in retail security labels.

The second magnetic material, which functions as a magnetic bias material, preferably has medium coercivity material and its nature is less critical; it may, for example, be steel, nickel, ferrite etc. A ferrite-based material such as is commonly used for manufacturing audio and video recording tape is particularly convenient for use with thin film high permeability material, since it can be deposited directly onto the back of the plastic layer supporting the film. This makes for very simple, low-cost manufacture.

The tag as thus described is broadly similar in construction and materials to certain types of label used in retail security applications, and supplied by companies such as Sensormatic (USA), Knogo (USA), 3M (USA) and Esselte Meto (Germany). In such types of labels the medium coercivity layer is magnetised when the product is sold, rendering the label inactive either by biassing it into saturation, or by magnetically cutting the label into short low-permeability sections.

In the present invention the second magnetic material or biassing element is magnetised with a field pattern which varies spatially in amplitude and/or sign and/or direction. This can be done by using discrete magnetised sections of bias-layer material, or by writing the bias pattern on a continuous layer using for example a magnetic recording head. The label is preferably interrogated by a low-frequency alternating magnetic field with a simultaneously-present low amplitude high-frequency alternating magnetic field. The low frequency field has sufficient amplitude to overcome the local biasing created by the magnetised layer of the label. Clearly, if the bias levels are different in different regions, then the bias will be overcome at different points (times) in the low frequency field scan.

The high-frequency interrogation field has lower amplitude by a factor of typically 3 than the low frequency field. When the local bias has been overcome by the low frequency field, harmonics of the high frequency will be produced by the non-linear B-H characteristic of the high permeability material. These can readily be detected by a suitably-tuned receiver. By noting the pattern of harmonic bursts during the low frequency cycle, the particular magnetisation pattern of the label can be detected.

Retail security systems already exist which use interrogation schemes which are appropriate for the coded labels described. For example, Esselte Meto sells products using low frequency scanning at 16 Hz, high frequency interrogation at 6.25 kHz, and 2nd harmonic detection. In other products high frequencies of 5 kHz and 7.5 kHz are used with a 16 Hz scan, detection of the intermodulation product at 12.5 kHz being used. In both cases the coded tags of this invention may be detected, and this requires only software changes to decode the data content of the tag.

If the levels of magnetisation used in the label are represented by +1, 0 and −1, then signal bursts can be produced at three points in the low frequency cycle. In principle this will allow for at least 3 unique label "signatures" (3 bursts/cycle, 2 bursts/cycle and 1 burst/cycle). If time of burst occurrence can also be employed, further codes can be distinguished. However burst time is dependant on the amplitude of the low frequency interrogating field, and is therefore dependant on label orientation. —For this reason timing information is harder to exploit reliably.

With more levels of magnetisation, many more codes (i.e. magnetic signatures) can be provided, the ultimate limits coming from the size of label required, and the resolution of the detection system. As already mentioned, account also needs to be taken of the effect of orientations, since, as the label is rotated in the interrogation field, the anisotropic nature of the label means that the effective field amplitude seen by the label will change, and the positions of the signal bursts will move.

It is easiest to relate to coding schemes where the presence or absence of distinct independent features correspond to data bits. However, this is not essential. A great variety of complex arbitrary signal shapes can be created by suitably configuring the field pattern stored on the label. These shapes are highly repeatable in manufacture, and can readily be recognised by pattern-matching software in the signal receiver. This type of coding extends the number of codes which can be produced with a small number of bias levels, and is particularly suitable for applications where highly distinctive codes are required, e.g. in anti-counterfeiting.

The size of tag will depend on sensitivity of the detection system and more fundamentally on the smallest length of strip or area of thin film material which can provide adequately high permeability (allowing for shape demagnetisation). For the narrowest, thinnest strip material currently freely available (approximately 1 mm wide×20 $\mu$m thick) this is around 20 mm. A tag as described above, providing 3 unique unambiguous patterns, would therefore need to be around 60 mm long.

Thin film material with an active layer around 1 $\mu$m thick can readily maintain high permeability for patches of about 5 mm×5 mm; and so using this material the 3-code label example could be implemented in a label 15 mm×5 mm.

DETAILED DESCRIPTION

For a better understanding of the invention, and to show how the same may be carried into effect, reference will now be made, by way of example, to the accompanying drawings, in which.

Figure 1A:
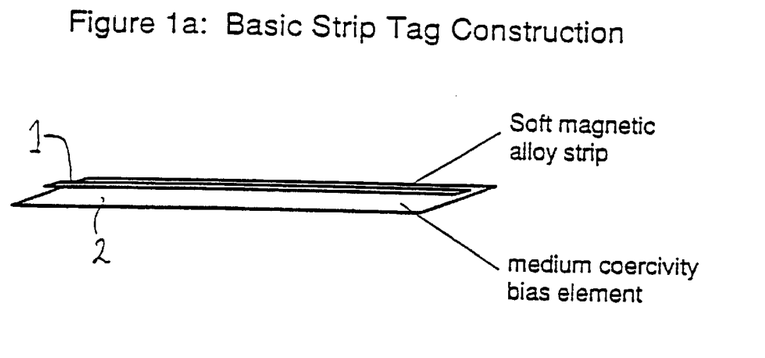
FIG. 1a illustrates diagrammatically a magnetic tag in accordance with a first embodiment of this invention.

Referring now to the drawings, FIG. 1a shows one form of tag in accordance with this invention. The tag comprises a first magnetic material 1 in the form of an elongate strip of a material characterised by high permeability, low coercivity and a non-linear B-H characteristic. Suitable materials for this purpose include amorphous magnetic alloy materials such as those available from Vacuumschmeltze under the designation 6025 or 6066. The magnetic material does not need to be amorphous, however; a suitable alternative may readily be selected from the Permalloy materials. Because of its magnetic behaviour, this material can be termed a soft magnetic strip.

Magnetic strip 1 is secured, for example by means of a contact adhesive (not shown), to a second magnetic material 2 in the form of a rectangular lamella of a material which is capable of being permanently magnetised; the material preferably has high remanence and a medium coercivity. For ease of illustration, the two magnetic materials 1 and 2 are depicted slightly apart.

A variety of materials may be used to form lamella 2; examples include foils formed of steels, nickel or nickel alloys; and tapes comprising a substrate carrying a magnetic layer or film, e.g. of ferrite. Such tapes are available commercially for audio or video recording purposes. In this embodiment, a ferrite-loaded polymer tape is used. The tape was approximately 10 $\mu$m thick and had a coercivity of 300 oersted and was obtained from Kurz Foils (UK) Ltd. as part B920224D (this is generally used in cards such as credit cards, swipe cards and the like where the material constitutes the magnetic stripe).

When the tag is ready for use, lamella 2 carries data in the form of a magnetic pattern which may be relatively simple or relatively complex. For ease of illustration and to assist in explaining the mode of operation of the invention, only simple magnetic patterns are illustrated in the drawings. It will be appreciated, however, that complex magnetic patterns may be applied to the lamella 2 by, for example, writing using a magnetic recording head or a series of such heads. By such simple means, complex magnetic patterns can be generated and stored on the tag. With suitable protocols, this magnetic pattern is used to represent data—in particular (but not exclusively) data which serves to identify an article to which the tag is attached.

In use, the lamella 2 influences the magnetic behaviour of the soft magnetic material 1; it is thus convenient to refer to the medium coercivity material as a bias material, and lamella 2 as a bias element.

Figure 1B:
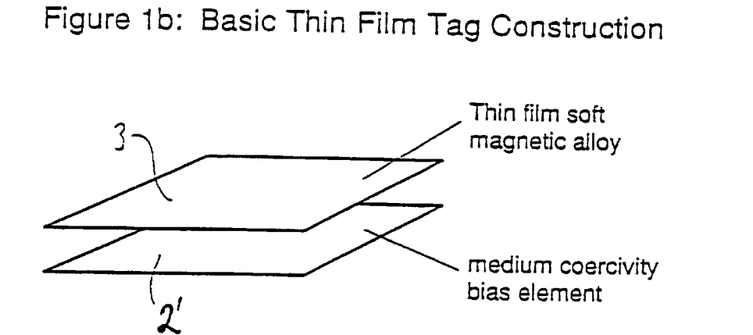
FIG. 1b illustrates diagrammatically a magnetic tag in accordance with a second embodiment of this invention.

FIG. 1b shows an alternative form of tag in which the first (soft) magnetic material is in the form of a thin film 3 of magnetic material of the type produced by IST (Belgium) for use in retail security labels. This is secured, for example by means of a contact adhesive (not shown), to bias element 2'. For ease of illustration, the two magnetic materials are depicted slightly apart. Lamella 2' is formed of the same material as lamella 2 in FIG. 1a, but here it is in the form of a square 5 mm×5 mm.

Figure 2:
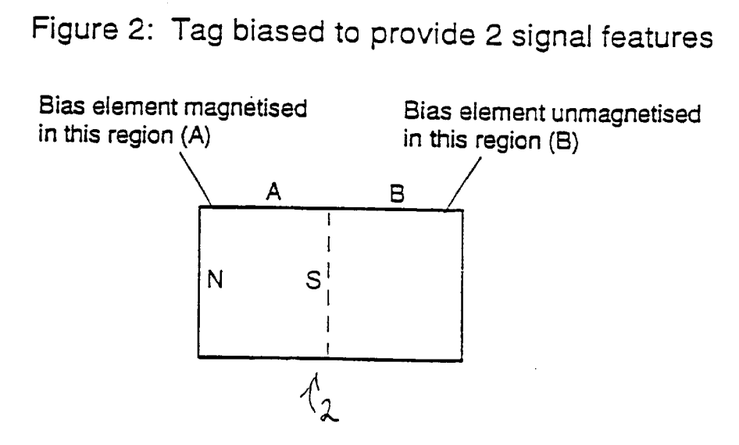
FIG. 2 illustrates diagrammatically the application of two bits of data to a magnetic tag in accordance with the invention.

FIG. 2 illustrates the manner in which data is carried by a tag in accordance with this invention. The bias element 2 is magnetised in a first region A and unmagnetised in a second region B. The direction of magnetisation in region A is indicated by the poles N-S.

Figure 3:
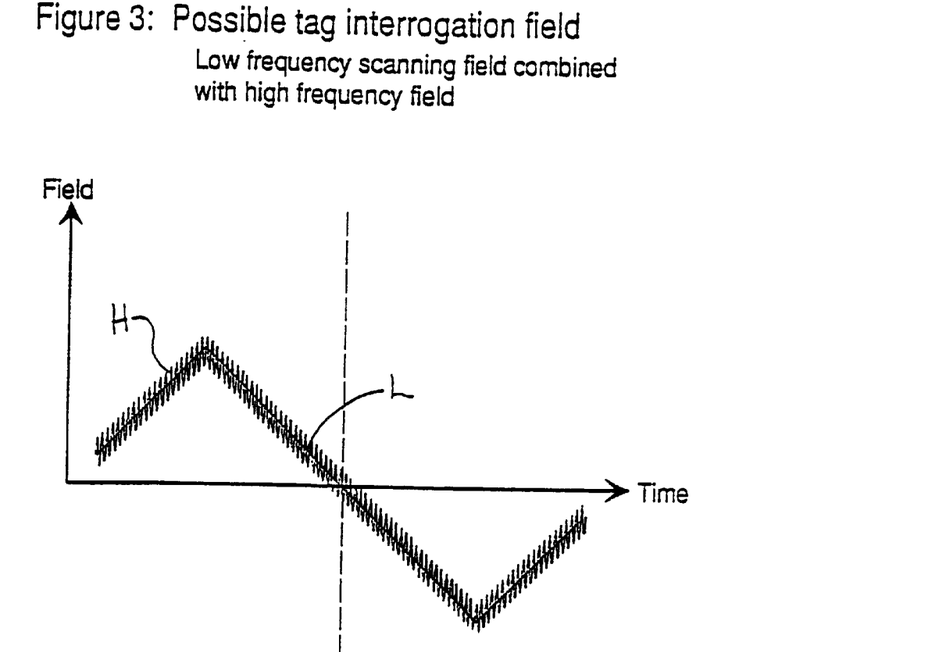
FIGS. 3 and 4 illustrate one mode of detecting the presence of, and reading data from, a magnetic tag in accordance with the invention.
Figure 4:
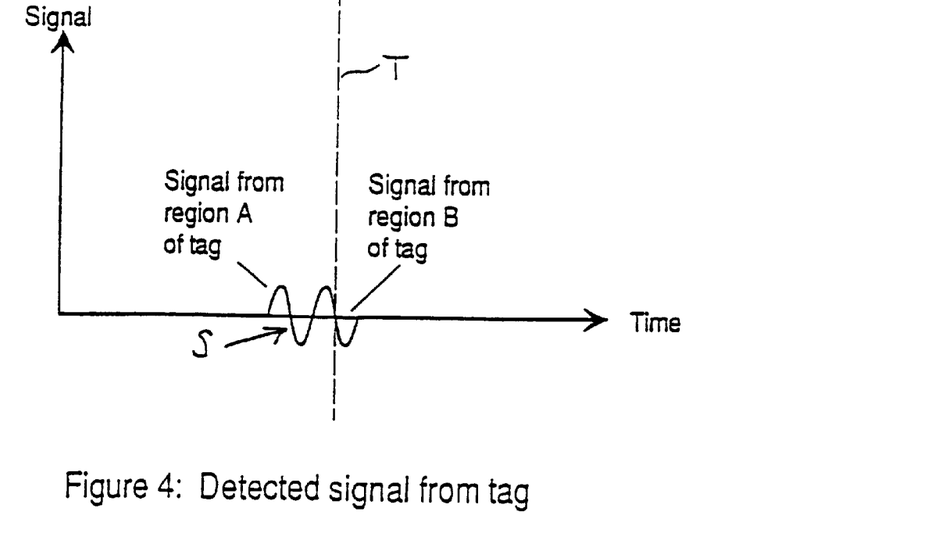

FIGS. 3 and 4 show a convenient mode of interrogating a tag such as those of FIG. 1. FIG. 3 shows a plot of applied magnetic-field H against time; the applied field comprises two components, the first being a high frequency, low amplitude field (not shown separately but evident from the form of field H); and the second being a low frequency, high amplitude field—represented in FIG. 3 by the triangular waveform L. This type of field is advantageous because it permits relatively simple techniques to be used in the detection system; an alternative approach would be to use just on alternating magnetic field of relatively large amplitude and a more sophisticated detection set up utilising data processing and pattern recognition techniques known per se.

When a tag of this invention—e.g. that of FIG. 1a—is positioned within an interrogation zone to which the alternating field H of FIG. 3 is applied, the soft magnetic strip 1 interacts with the applied field and generates a detectable response which is indicative of the magnetic character of the whole tag. The behaviour of such materials in magnetic fields is well known per se. The soft magnetic material generates a magnetic response in which harmonics of the applied field signal are present, the detailed magnetic character of the response representing a magnetic signature for the tag. With exceedingly simple tags such as that of FIG. 2 (which is a two-bit tag by virtue of having two magnetically distinct regions A and B) a suitable detector (examples of which will be given hereinafter) will produce an output of the form shown in FIG. 4. For reasons of clarity, the scale of the time axes in FIGS. 3 and 4 is not the same. The form of the response is shown as a plot of detected signal S against time. Dashed line T, linking FIGS. 3 and 4, shows the instantaneous field in FIG. 3 at which signal S of FIG. 4 intersects the time axis—i.e. the instantaneous output signal strength is zero at the moment when the instantaneous applied field is zero.

FIGS. 3 and 4 help to illustrate the mode of operation of the tag. When the instantaneous field strength is zero, that part of the soft magnetic material in strip 1 above region B of bias element 2 is able to respond as it would in the free condition, since region B carries no magnetisation; it thus generates a harmonic burst illustrated in FIG. 4 by the sine wave on the right of plot S. The other portion of strip 1, i.e. that over region A of bias element 2, generates a similar response but at a different time—namely the time at which the applied field H counteracts the field imposed on the strip 1 by region A. Consequently region A of element 2 gives rise to a signal indicated as the sine wave to the left of signal S in FIG. 4—in this case before the signal from portion B is obtained.

Figure 5:
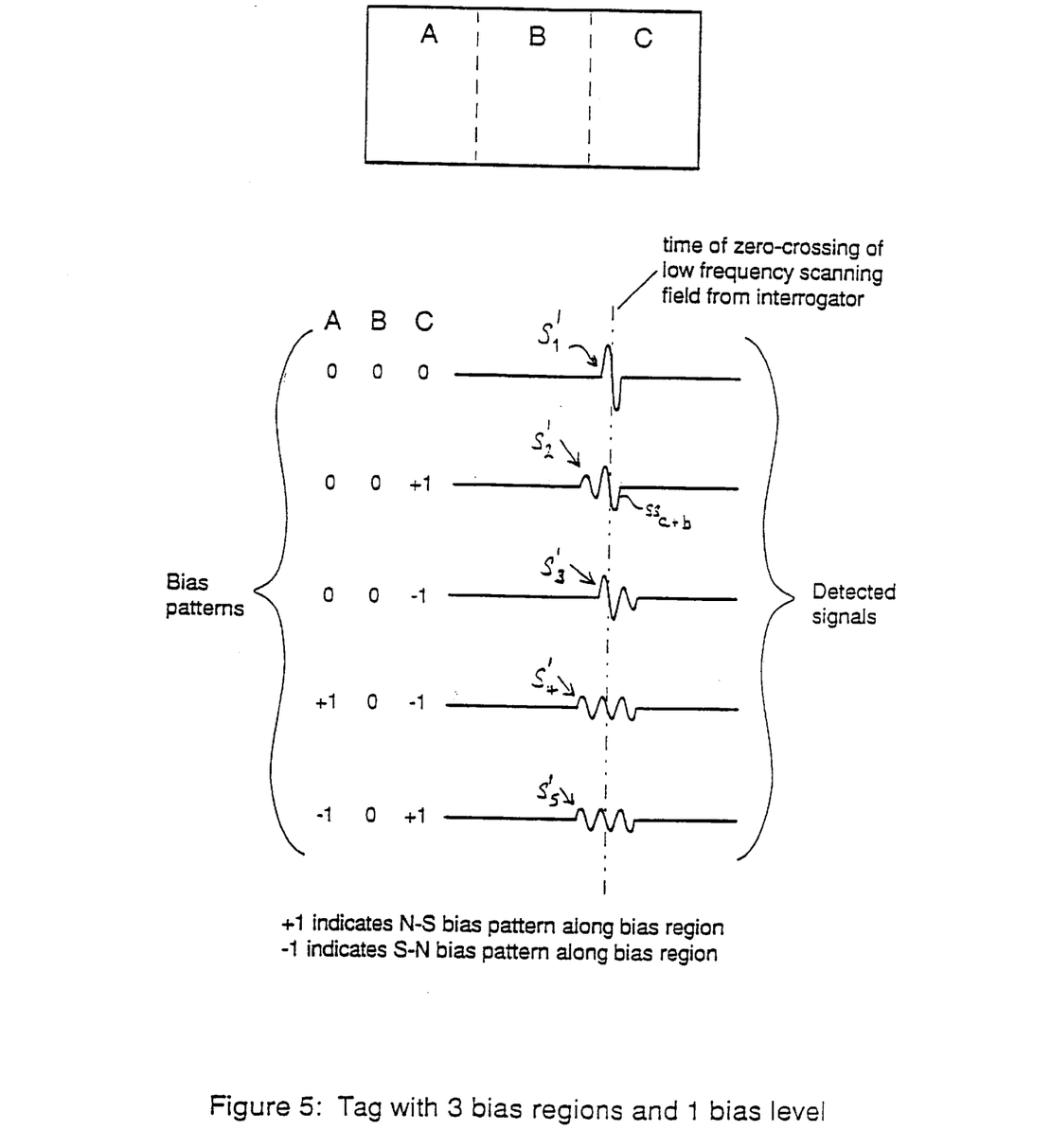
FIG. 5 illustrates diagrammatically the magnetic response of five simple tags in accordance with this invention each of which comprises three zones or bias regions.

FIG. 5 illustrates a tag with three zones, A, B and C, and illustrates the detected signals $S'_1$–$S'_5$ for a variety of magnetic configurations of these three zones. The plots of detected signals S' given in FIG. 5 are analogous to that of FIG. 4.

The first plot $S'_1$ represents a control in which all three zones A–C are unmagnetised. Here, the overlying soft magnetic strip 1 suffers no magnetic bias from element 2 and behaves effectively as though it were free of lamella 2; and the signal $S'_1$ sweeps out a relatively large area. In plot $S'_2$, two thirds of the bias element (i.e. zones A and B) have zero magnetisation, which leads to a sine wave response $ss_{a+b}$ which sweeps out an area two thirds of that of signal $S'_1$. The magnetised zone C gives rise to sine wave signal component $ss_c$ which sweeps out an area one third of that of signal $S'_1$. Signal plot $S'_3$ is a mirror image of that of $S'_2$; this is due to the fact that the polarity of zone C is reversed in plot $S'_3$.

Similar considerations lead-to the observed structure of the detected signal in the cases of plots $S'_4$ and $S'_5$; it will be observed that these two plots, representing magnetisation conditions of +1/0/–1 and –1/0/+1 respectively—are redundant.

Figure 6:
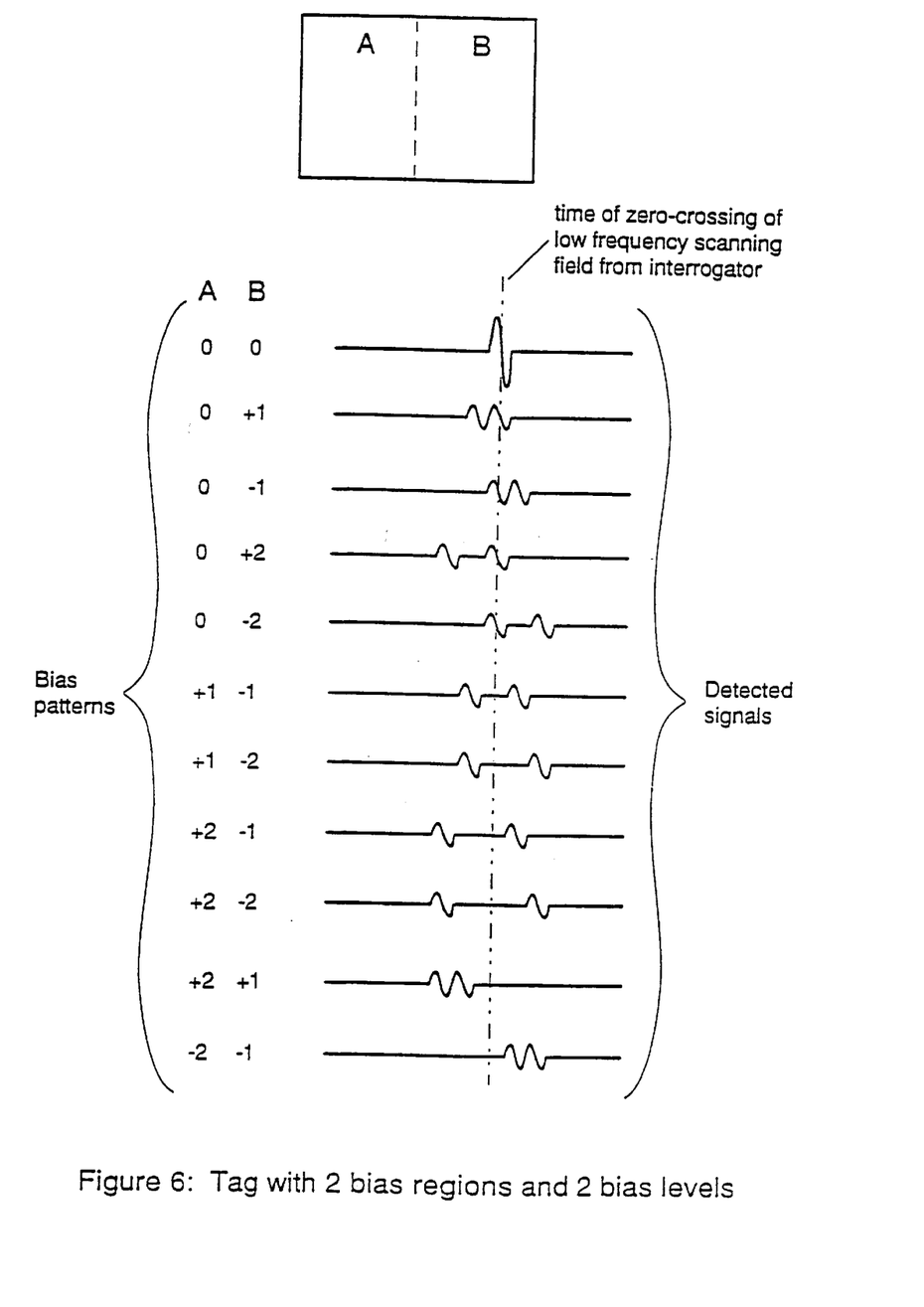
FIG. 6 illustrates diagrammatically the magnetic response of eleven further simple tags in accordance with this invention each of which comprises two zones or bias regions and which carry a magnetic pattern with two possible levels of magnetisation.

FIG. 6 illustrates the responses obtained with just two regions, A and B, in the bias element 2, but with two bias levels, i.e. a total of five magnetisation states (+2 . . . 0 . . . –2). The resultant signal mapping will be understood by analogy to the description of FIGS. 3, 4 and 5 above.

In the examples illustrated above, the magnetisation within any given zone is taken to be uniform; and consequently the observed patterns of detected signal are geometrically simple, being sine waves which sweep out areas proportional (at a first approximation) to the length of the strip material 1 generating the response or, correspondingly, to the areas of zones such as A, B, C in lamella 2 which acts upon that length of soft magnetic material. It is not, however, a requirement that such a simple magnetic field pattern be employed; on the contrary, in many cases it will be advantageous to use a magnetic field pattern which varies in orthogonal directions across the lamella 2, thereby constituting the basis of a magnetic signature for the tag. When using tags with more complex field patterns, it is necessary to use more sophisticated detection systems; these, however, can utilise known data processing and pattern recognition techniques to identify the signature obtained when any given tag is interrogated by an appropriate magnetic field.

Figure 7:
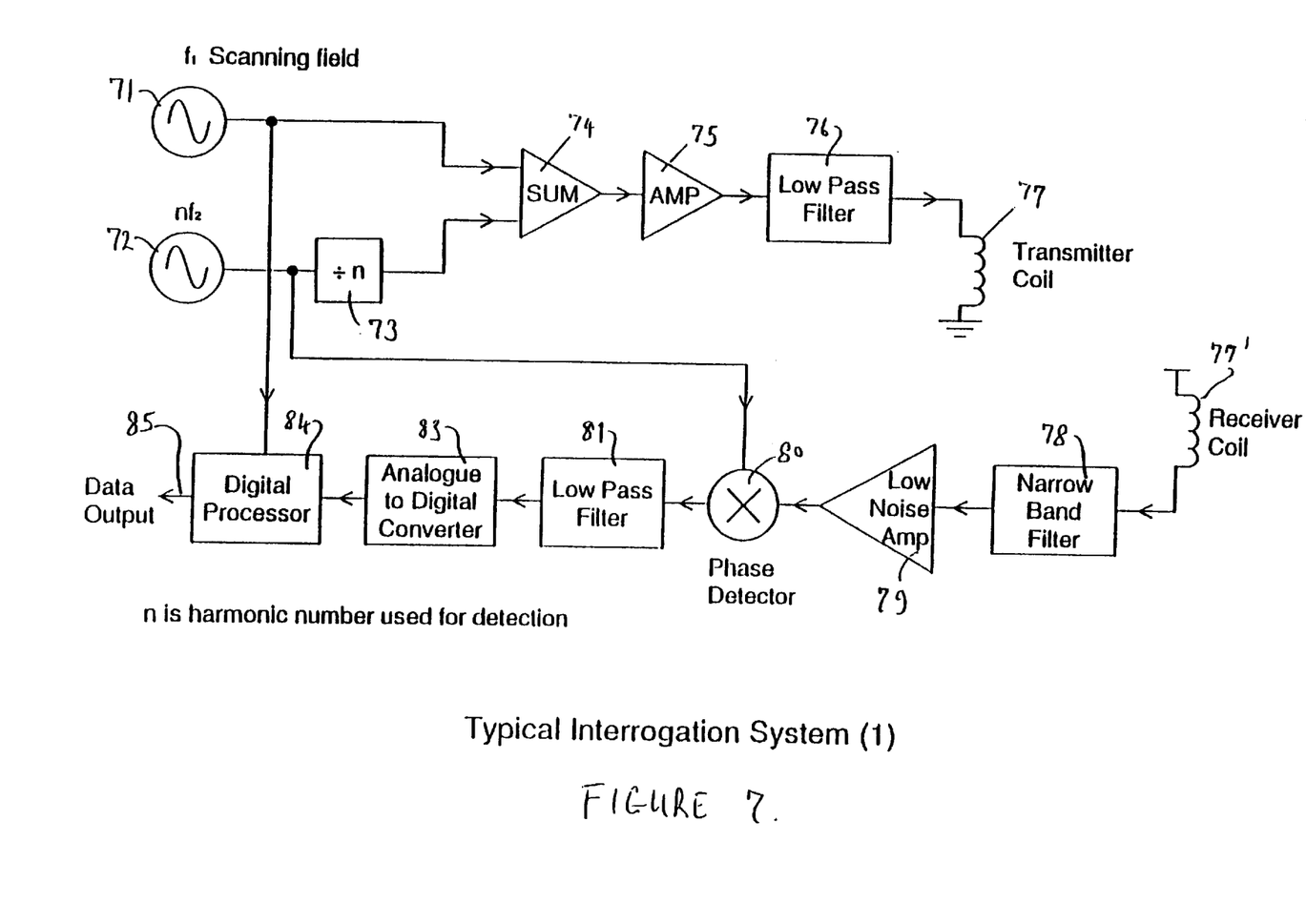
FIG. 7 illustrates diagrammatically a first tag interrogation or read system suitable for use with tags of this invention.

Referring now to FIG. 7, a presently preferred form of detection system is shown. This comprises two alternating current sources 71 and 72, operating at frequencies $f_1$ and $nf_2$ respectively, which are combined by way of summing amplifier 74, the frequency of current source 72 first being divided by n by frequency divider 73. The output of summing amplifier 74 is amplified by amplifier 75, and is passed through a low pass filter 76 with a cut-off frequency $f_2$ to a transmitter coil 77. The harmonic responses to the interrogation signal of any tags or markers of this invention present in the interrogation zone are received by a receiver coil 77', which may be the same coil as transmitter coil 77. Band pass filter 78 removes any signals received which fall outside a predetermined bandwidth, e.g. $nf_2 \pm m.f_1$, and then passes the residual signal through low noise amplifier 79 to phase detector 80, which correlates the phase of the signal with that of current source 72. The signal is then passed through low pass filter 81 with a cut-off frequency $m.f_1$ to analogue-to-digital converter 83, and thence to digital signal processor 84, which analyses the signal for harmonic responses at the $m.f_1$ sidebands caused by the presence of a tag in the interrogation zone. This information is available as a time domain signal of a particular shape which repeats at the low frequency $f_1$. The resultant data output is at 85. Processor 84 contains pattern recognition circuitry known per se; if the shape of the time domain signal corresponds within acceptable bounds to a shape which is known to be the "magnetic signature" of a predetermined tag, then a correspondence condition is achieved and, by using a data bank or look-up table, the identity of the article to which the tag is attached can be given.

Figure 8:
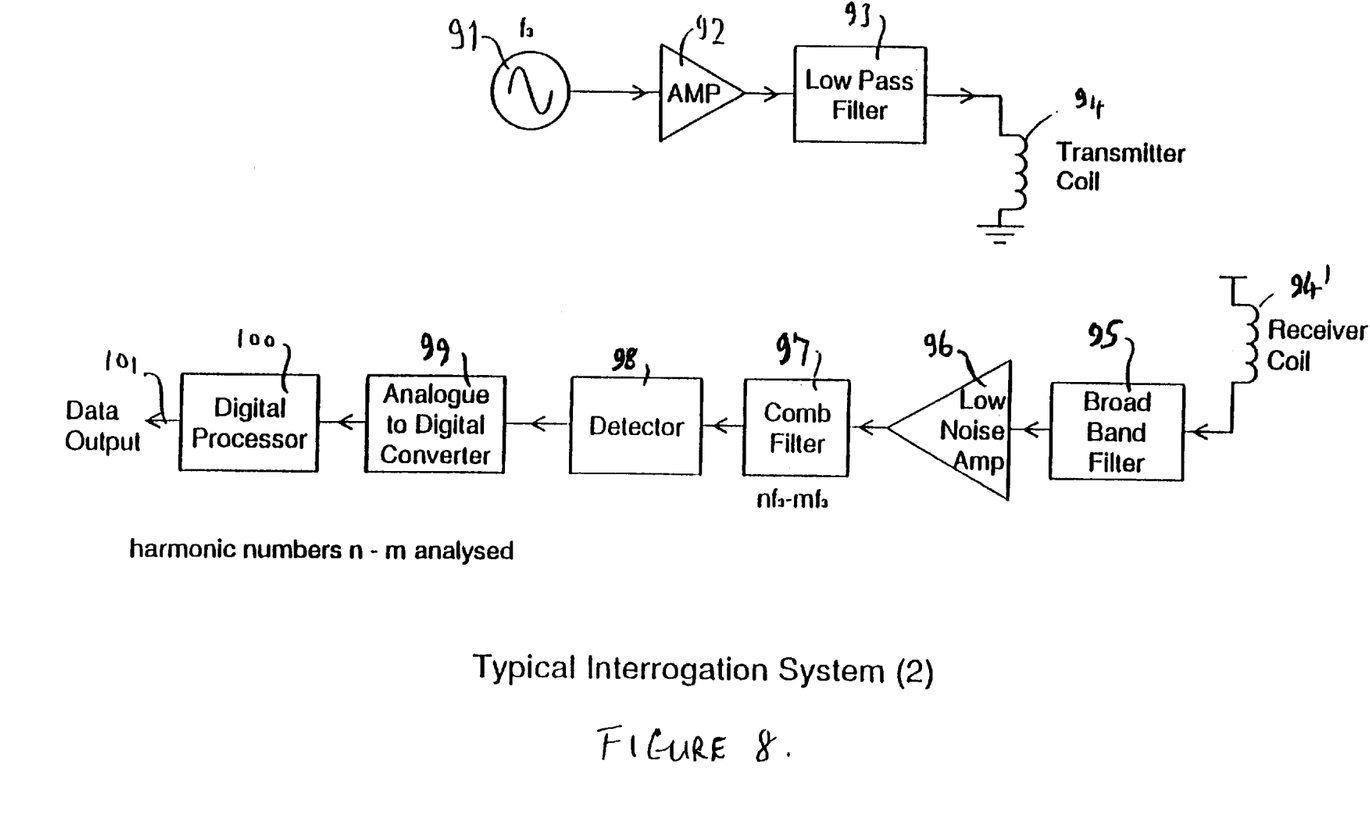
FIG. 8 illustrates diagrammatically a second tag interrogation or read system suitable for use with tags of this invention.

FIG. 8 shows an alternative interrogation system in which a single current source at alternating frequency $f_3$ is supplied to a low noise amplifier 92, and is passed through a low pass filter 93 to a transmitter coil 94. The harmonic responses to the interrogation signal of any tags or markers of this invention present in the interrogation zone are received by a receiver coil 94', which may be the same coil as transmitter coil 94. Broad band filter 95 removes unwanted frequency ranges from the signal from 94' and the output passes to low noise amplifier 96 and thence to multichannel or comb filter 97 ($nf_3$–$mf_3$) which permits harmonic numbers n–m to be analysed. The output of filter 97 passes to detector 98 and thence to analogue-to-digital converter 99. The output from converter 99 is processed by digital processor 100 which operates in a manner analogous to processor 84 described above in relation to FIG. 7 to generate an output 101.

What is claimed is:

1. A magnetic marker or tag, which comprises:
   a first layer of magnetic material characterised by high permeability, low coercivity and a non-linear B-H characteristic; wherein said first layer of magnetic material is coated with
   a second layer of magnetic material which is capable of being permanently magnetised, so as to have a non-uniform magnetic field pattern, said second layer of magnetic material comprising at least three discrete regions of magnetic bias material, wherein each of said discrete regions exhibits a different level and direction, such that during interrogation by a constant frequency alternating magnetic field, the magnetic bias levels of each of said discrete regions are overcome at different times in the interrogation cycle.

2. A magnetic marker or tag as claimed in claim 1, characterised in that the field pattern in said second material varies in amplitude.

3. A magnetic marker or tag as claimed in claim 1, characterized in that the field pattern in said second material varies in amplitude and/or direction.

4. A magnetic marker or tag as claimed in claim 1, characterised in that said second magnetic material is formed of discrete, magnetised sections of a magnetic bias material.

5. A magnetic marker or tag as claimed in claim 1, characterised in that said second magnetic material is formed by writing a magnetic field pattern onto a strip or tape of magnetic bias material.

6. A magnetic marker or tag as claimed in claim 5, characterised in that said magnetic field pattern varies across the width of said strip or tape.

7. A magnetic marker or tag as claimed in claim 1, characterised in that said first magnetic material has an extrinsic relative permeability greater than $10^3$ and a coercivity not more than 10 A/m.

8. A magnetic marker or tag as claimed in claim 7, characterised in that said first magnetic material is in the form of an elongate strip or wire.

9. A magnetic marker or tag as claimed in claim 8, characterised in that said strip-has dimensions in the ranges: width—from 0.1 mm to 10 mm; and thickness from 5 $\mu$m to 500 $\mu$m.

10. A magnetic marker or tag as claimed in claim 9, characterised in that said strip has dimensions in the ranges: width—from 0.5 mm to 5 mm; and thickness from 10 $\mu$m to 100 $\mu$m.

11. A magnetic marker or tag as claimed in claim 7, characterised in that said first magnetic material is in the form of a thin film.

12. A magnetic marker or tag as claimed in claim 1, characterized in that said first and second magnetic materials are in the form of layers supported by a substrate formed of paper or a plastics material.

13. A magnetic marker or tag as claimed in claim 1, characterised in that the marker is adapted to be secured to an article to serve as an identifying tag for that article.

14. A magnetic marker or tag as claimed in claim 13, characterised in that the marker or tag serves as an antipilferage or anti-counterfeiting tag.

15. A magnetic marker or tag as claimed in any claim 13, characterised in that the marker or tag serves as a verification tag.

16. A data storage and retrieval system which comprises a plurality of magnetic markers or tags as claimed in claim 1 and a detection system comprising (i) first means for generating an alternating magnetic field; (ii) second means for detecting harmonics generated by the interaction between the first magnetic material of the tag and the alternating magnetic field produced in use by said first means; and (iii) third means for correlating the detection of harmonics by said second means with the alternating magnetic field generated by said first means.

17. A data storage and retrieval system as claimed in claim 16, characterised in that said first means is arranged so that, in use, it generates a first, high frequency alternating magnetic field and a second, low frequency alternating magnetic field.

18. A system as claimed in claim 17, characterised in that said first means is adapted to generate a high frequency alternating magnetic field at a frequency in the range of from 250 Hz to 20 kHz.

19. A system as claimed in claim 18, characterised in that said first means is adapted to generate an alternating magnetic field at a frequency in the range of from 3 kHz to 10 kHz.

20. A system as claimed in claim 16, characterised in that said third means is arranged to determine the number of harmonic bursts detected by said second means per cycle of the alternating field generated by said first means.

21. A system as claimed in claim 20, characterised in that said third means is arranged to determine the point or points within each cycle of said alternating field at which harmonic bursts are detected by said second means.

22. A system as claimed in claim 16 characterized in that said first means is adapted to generate an alternating magnetic field at a frequency in the range of from 50 Hz to 20 kHz.

23. A system as claimed in claim 17, characterised in that first means is adapted to generate a low frequency alternating magnetic field at a frequency in the range of from 1 Hz to 250 Hz.

24. A system as claimed in claim 23, characterised in that said first means is adapted to generate a low frequency alternating magnetic field at a frequency in the range of from 5 Hz to 50 Hz.

25. A system as claimed in claim 24, characterised in that said first means is adapted to generate a high frequency alternating magnetic field at a frequency in the range of from 1 kHz to 10 kHz and a low frequency alternating magnetic field at a frequency in the range of from 8 Hz to 50 Hz.

26. A system as claimed in claim 25, characterised in that said first means is adapted to generate a high frequency alternating magnetic field at a frequency in the range of from 4 kHz to 8 kHz and a low frequency alternating magnetic field at a frequency in the range of from 10 Hz to 20 Hz.

27. A method of coding articles so as to make it possible to distinguish between different classes of articles and/or to distinguish between different classes of articles and/or to distinguish between individual articles within a given class, which comprises (1) applying to said articles a magnetic marker or tag comprising a first layer of magnetic material characterised by high permeability, low coercivity and a non-linear B-H characteristic, wherein said first layer of magnetic material is coated with a second layer of magnetic material which is capable of being permanently magnetised; and (2) generating a predetermined, non-uniform permanent magnetic field pattern in said second magnetic material by magnetising said second layer of magnetic material either before or after it has been applied to said article, said magnetic field pattern comprising at least three discrete regions of magnetic bias material, wherein each of said discrete regions exhibits a different combination of magnetisation level and direction, such that during interrogation by a constant frequency alternating magnetic field, the magnetic bias levels of each of said discrete regions are overcome at different times in the interrogation cycle, and wherein said magnetic field pattern is selected so as to be readable with suitable configured apparatus and to be distinctive of said article or of the class to which said article belongs when so read.

28. A method of detecting the presence of an article within a predetermined interrogation zone, which comprises (A) attaching to or incorporating into the article, before the article reaches said interrogation zone, a magnetic marker as claimed in claim 12 and which carries a unique magnetic code so as to be distinctive of the article; (B) determining the magnetic interaction between said magnetic marker and an applied magnetic field capable of interacting with said magnetic marker to generate a detectable response; (C) recording in a directory the correlation between said article, said magnetic marker and its magnetic interaction determined by step B; and (D) subjecting the volume defined by said interrogation zone to substantially the same magnetic conditions as were used in step B while one or more unknown articles are located within said zone, and determining the resultant magnetic interaction(s); (E) comparing the detected interaction(s) with data in said directory; and (F) generating a response indicating the nature of the article whenever correlation data in said directory provides a match between the magnetic interaction generated in step (D) and that in step (B).

29. A method according to claim 28, characterised in that said applied magnetic field comprises (i) a first alternating, low frequency magnetic field and (ii) a second alternating, high frequency magnetic field.

30. A magnetic marker or tag, which comprises a first layer of magnetic material characterised by high permeability, low coercivity and a non-linear B-H characteristic wherein said first layer of magnetic material is coated with a second layer of magnetic material which is capable of being permanently magnetised, characterised in that said second layer of magnetic material is magnetised with a non-uniform field pattern;

said first magnetic material having an extrinsic relative permeability greater than $10^3$ and a coercivity not more than 10 A/m;

said first layer of magnetic material being in the form of a thin film; and said thin film material being in the form of one or more patches, each having an area in the range 1 mm$^2$ to 500 mm$^2$.

31. A magnetic marker or tag as claimed in claim 30, characterised in that said one or more patches each have an area in the range from 10 mm$^2$ to 100 mm$^2$.

32. A magnetic marker or tag as claimed in claim 30, characterised in that said one or more patches each have a thickness in the range from 0.1 μm to 10 μm.

33. A data storage and retrieval system which comprises:

a plurality of magnetic markers or tags, each said marker or tag comprising a first layer of magnetic material characterised by high permeability, low coercivity and a nonlinear B-H characteristic wherein said first layer of magnetic material is coated with a second layer of magnetic material which is capable of being permanently magnetised, characterised in that said second layer of magnetic material is magnetised with a non-uniform field pattern;

a detection system comprising (i) first means for generating an alternating magnetic field; (ii) second means for detecting harmonics generated by the interaction between the first layer of magnetic material of the tag and the alternating magnetic field produced in use by said first means; and (iii) third means for correlating the detection of harmonics by said second means with the alternating magnetic field generated by said first means; and said third means being arranged to determine the amplitude and phase of the harmonics generated by the interaction of the first layer of magnetic material of the tag and the alternating magnetic field, the harmonics of interest being selected from harmonics in the range of 2 to 100.

34. A data storage and retrieval system which comprises:

a plurality of magnetic markers or tags, each said marker or tag comprising (a) a first layer of magnetic material characterised by high permeability, low coercivity and a nonlinear B-H characteristic wherein said first layer of magnetic material is coated with a second layer of magnetic material which is capable of being permanently magnetised, characterised in that said second magnetic material is magnetised with a non-uniform field pattern;

a detection system comprising (i) first means for generating an alternating magnetic field; (ii) second means for detecting harmonics generated by the interaction between the first magnetic material of the tag and the alternating magnetic field produced in use by said first means; and (iii) third means for correlating the detection of harmonics by said second means with the alternating magnetic field generated by said first means; and said third means being arranged to determine the characteristics of said harmonics produced by the marker and to compare the detected characteristics with information in a data bank, said information serving to correlate the detected characteristics with known characteristics relating to items on an inventory.

35. A data storage and retrieval system which comprises:

a plurality of magnetic markers or tags, each said marker or tag comprising (a) a first layer of magnetic material characterised by high permeability, low coercivity and a non-linear B-H characteristic wherein said first layer of magnetic material is coated with a second layer of magnetic material which is capable of being permanently magnetised, characterised in that said second magnetic material is magnetised with a non-uniform field pattern;

a detection system comprising (i) first means for generating an alternating magnetic field; (ii) second means for detecting harmonics generated by the interaction between the first magnetic material of the tag and the alternating magnetic field produced in use by said first means; and (iii) third means for correlating the detection of harmonics by said second means with the alternating magnetic field generated by said first means; and said detection system being arranged to determine the characteristics of harmonic bursts produced by the marker and to compare the detected characteristics with information in a data bank, said information serving to correlate the detected characteristics with known characteristics relating to items on an inventory.

36. A system as claimed in claim 35 characterised in that said detection system is arranged to determine the characteristics of harmonic bursts produced by the marker and to compare the detected characteristics with information in a data bank, said information serving to correlate the detected characteristics with known characteristics relating to items on an inventory, and also characterised in that said detection system is arranged to measure the shape of the envelope of said harmonic bursts.

* * * * *